United States Patent
Okawa et al.

(10) Patent No.: US 8,630,069 B1
(45) Date of Patent: Jan. 14, 2014

(54) MAGNETIC SHIELD HAVING IMPROVED RESISTANCE TO THE HARD BIAS MAGNETIC FIELD

(71) Applicant: HGST Netherlands B.V., Amsterdam (NL)

(72) Inventors: Norihiro Okawa, Odawara (JP); Kouji Okazaki, Odawara (JP); Yoshibumi Matsuda, Hiratsuka (JP); Hiroshi Akiyama, Odawara (JP)

(73) Assignee: HGST Netherlands B.V., Amsterdam (NL)

(*) Notice: Subject to any disclaimer, the term of this patent is extended or adjusted under 35 U.S.C. 154(b) by 0 days.

(21) Appl. No.: 13/644,343

(22) Filed: Oct. 4, 2012

(51) Int. Cl.
*G11B 5/39* (2006.01)

(52) U.S. Cl.
USPC ................................ 360/319; 360/324.12

(58) Field of Classification Search
USPC .............................................. 360/319, 324.12
See application file for complete search history.

(56) References Cited

U.S. PATENT DOCUMENTS

| | | | |
|---|---|---|---|
| 6,292,334 B1 | 9/2001 | Koike et al. | |
| 6,496,335 B2 | 12/2002 | Gill | |
| 7,180,712 B1* | 2/2007 | Li et al. | 360/319 |
| 7,468,870 B2 | 12/2008 | Arasawa et al. | |
| 7,518,824 B2 | 4/2009 | Sasaki et al. | |
| 7,983,001 B2 | 7/2011 | Sato et al. | |
| 8,049,997 B2* | 11/2011 | Miyauchi et al. | 360/319 |
| 8,437,106 B2* | 5/2013 | Yanagisawa et al. | 360/319 |
| 8,462,467 B2* | 6/2013 | Yanagisawa et al. | 360/319 |
| 2002/0034054 A1* | 3/2002 | Michel et al. | 360/319 |
| 2002/0064002 A1* | 5/2002 | Gill | 360/319 |
| 2007/0081277 A1 | 4/2007 | Folks et al. | |
| 2007/0195467 A1* | 8/2007 | Gill | 360/319 |
| 2008/0070063 A1 | 3/2008 | Ibusuki et al. | |
| 2009/0135529 A1* | 5/2009 | Shimazawa et al. | 360/319 |
| 2009/0190272 A1* | 7/2009 | Machita et al. | 360/319 |
| 2009/0279213 A1* | 11/2009 | Wu et al. | 360/319 |
| 2010/0079917 A1* | 4/2010 | Miyauchi et al. | 360/319 |
| 2011/0279923 A1* | 11/2011 | Miyauchi et al. | 360/75 |
| 2012/0087045 A1* | 4/2012 | Yanagisawa et al. | 360/294 |
| 2012/0087046 A1* | 4/2012 | Yanagisawa et al. | 360/294 |
| 2012/0327537 A1* | 12/2012 | Singleton et al. | 360/244 |

OTHER PUBLICATIONS

Stutzke et al., "Low-frequency noise measurements on commercial magnetoresistive magnetic field sensors," Journal of Applied Physics, vol. 97, Issue 10, Proceedings of the 49th Annual Conference on Magnetism and Magnetic Materials, Sensors, Microwaves, and Other Applications, May 17, 2005.

* cited by examiner

*Primary Examiner* — Will J Klimowicz
(74) *Attorney, Agent, or Firm* — Zilka-Kotab, PC

(57) ABSTRACT

In one embodiment, a magnetic head includes a magnetoresistance effect sensor including a free layer, a hard bias magnetic film adapted for performing magnetic domain control of the free layer by biasing a magnetization direction of the free layer towards a predefined direction that is positioned on both sides of the free layer in a track-width direction, an upper shield positioned above the hard bias magnetic film and the magnetoresistance effect sensor; and an antiferromagnetic (AFM) layer positioned above the upper shield. The upper shield includes first and second upper shield layers, and an AFM coupling layer positioned between the first upper shield layer and the second upper shield layer that is adapted for antiferromagnetically coupling the first upper shield layer and the second upper shield layer, wherein a magnetization of the first upper shield layer is antiparallel with a magnetization of the hard magnetic bias layer.

18 Claims, 7 Drawing Sheets

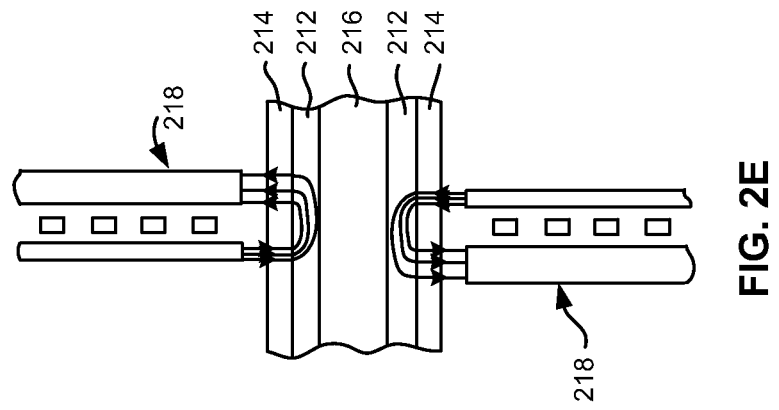
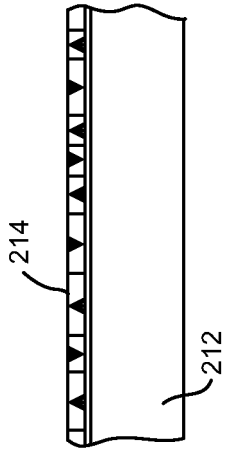
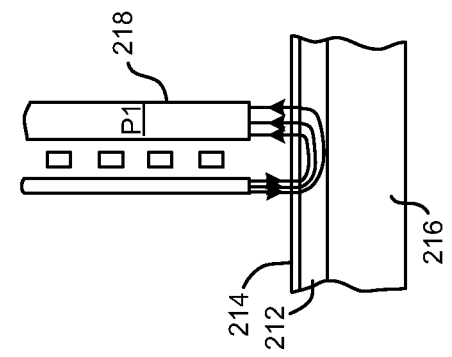
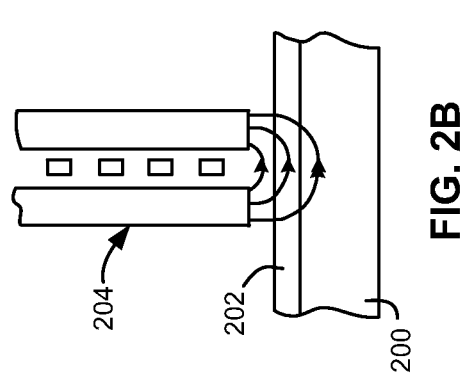

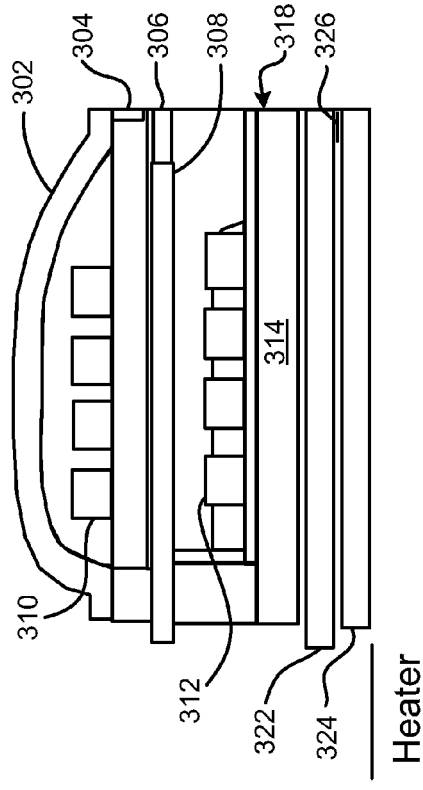
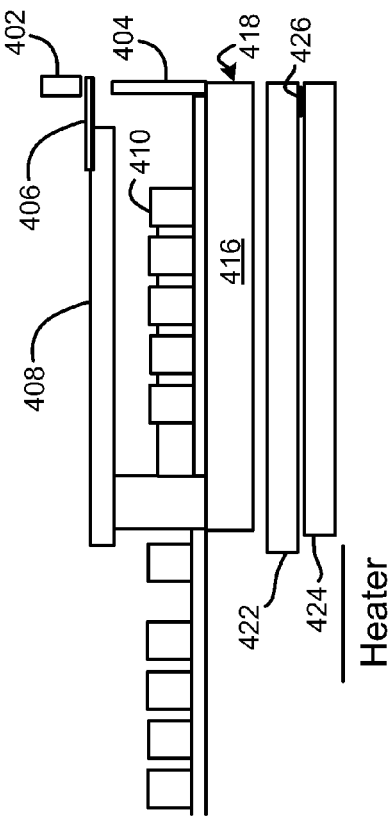
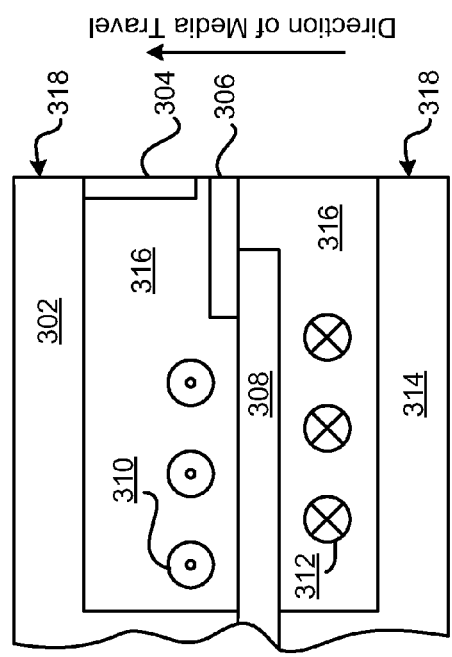
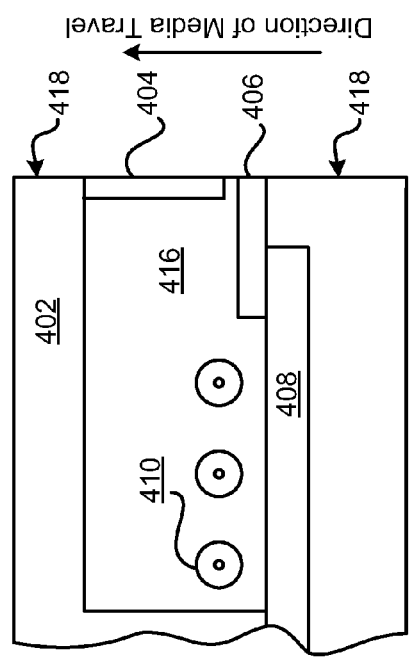
FIG. 3A
FIG. 3B
FIG. 4A
FIG. 4B

MAGNETIC SHIELD HAVING IMPROVED RESISTANCE TO THE HARD BIAS MAGNETIC FIELD

FIELD OF THE INVENTION

The present invention relates to magnetic recording, and more particularly to a magnetic head having a tunneling magnetoresistance (TMR) sensor and a magnetic shield that has improved resistance to a hard bias magnetic field produced by a hard bias film of the magnetic head.

BACKGROUND

Typically, a hard bias film is positioned at an end of a free layer of a magnetic head, and is constructed to apply a hard bias magnetic field to the free layer. This hard bias magnetic field converts the magnetization of the free layer to a single magnetic domain, thereby suppressing noise. If the magnetization of the free layer is not converted to a single magnetic domain, but has a multitude of domains, noise is generated.

Conventionally, with increased recording density, the read gap, i.e., the vertical separation of the magnetic shield from the read sensor, is narrowed, with the consequence that the hard bias magnetic field is more readily absorbed by the magnetic shield, which causes the hard bias magnetic field to be decreased as a result of this absorption. As a result, noise such as Barkhausen noise is generated in the magnetic head, which is undesirable.

A portion of a magnetic head 500 is shown in FIG. 5 according to the prior art. A conventional magnetic head 500 comprises a magnetic shield 502, a protective layer 504 between the magnetic shield 502 and a hard bias film 514, and a sensor 512, such as a tunneling magnetoresistance (TMR) sensor. In some magnetic heads 500, an insulating layer 506, a first underlayer 508 and a second underlayer 510 may be positioned below the hard bias film 514. As shown, magnetization 513 of the hard bias film 514 (the hard bias magnetic field) and magnetization 503 of the magnetic shield 502 are parallel (e.g., they have the same direction). This results in the hard bias magnetic field tending to be absorbed by the magnetic shield 502, which also causes noise to occur.

Accordingly, it would be beneficial to have a magnetic head design which has a high recording density but which also reduces the amount of the hard bias magnetic field which is absorbed by the magnetic shield.

SUMMARY

In one embodiment, a magnetic head includes a magnetoresistance effect sensor including a free layer, a hard bias magnetic film positioned on both sides of the free layer in a track-width direction, wherein the hard bias magnetic film is adapted for performing magnetic domain control of the free layer by biasing a magnetization direction of the free layer towards a predefined direction, an upper shield positioned above the hard bias magnetic film and the magnetoresistance effect sensor; and an antiferromagnetic (AFM) layer positioned above the upper shield, wherein the upper shield includes a first upper shield layer, a second upper shield layer positioned above the first upper shield layer, and an AFM coupling layer positioned between the first upper shield layer and the second upper shield layer, the AFM coupling layer being adapted for antiferromagnetically coupling the first upper shield layer and the second upper shield layer, wherein a magnetization of the first upper shield layer is antiparallel with a magnetization of the hard magnetic bias layer.

In another embodiment, a method for forming a magnetic head includes forming a magnetoresistance effect sensor including a free layer, forming a hard bias magnetic film on both sides of the free layer in a track-width direction, wherein the hard bias magnetic film is adapted for performing magnetic domain control of the free layer by biasing a magnetization direction of the free layer towards a predefined direction, forming a first upper shield layer above the hard bias magnetic film and the magnetoresistance effect sensor, forming a second upper shield layer above the first upper shield layer, forming an AFM coupling layer between the first upper shield layer and the second upper shield layer, the AFM coupling layer being adapted for antiferromagnetically coupling the first upper shield layer and the second upper shield layer, wherein the first upper shield layer, the AFM coupling layer, and the second upper shield layer together form an upper shield, and forming an AFM layer above the upper shield, wherein a magnetization of the first upper shield layer is antiparallel with a magnetization of the hard magnetic bias layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

Figure 1:
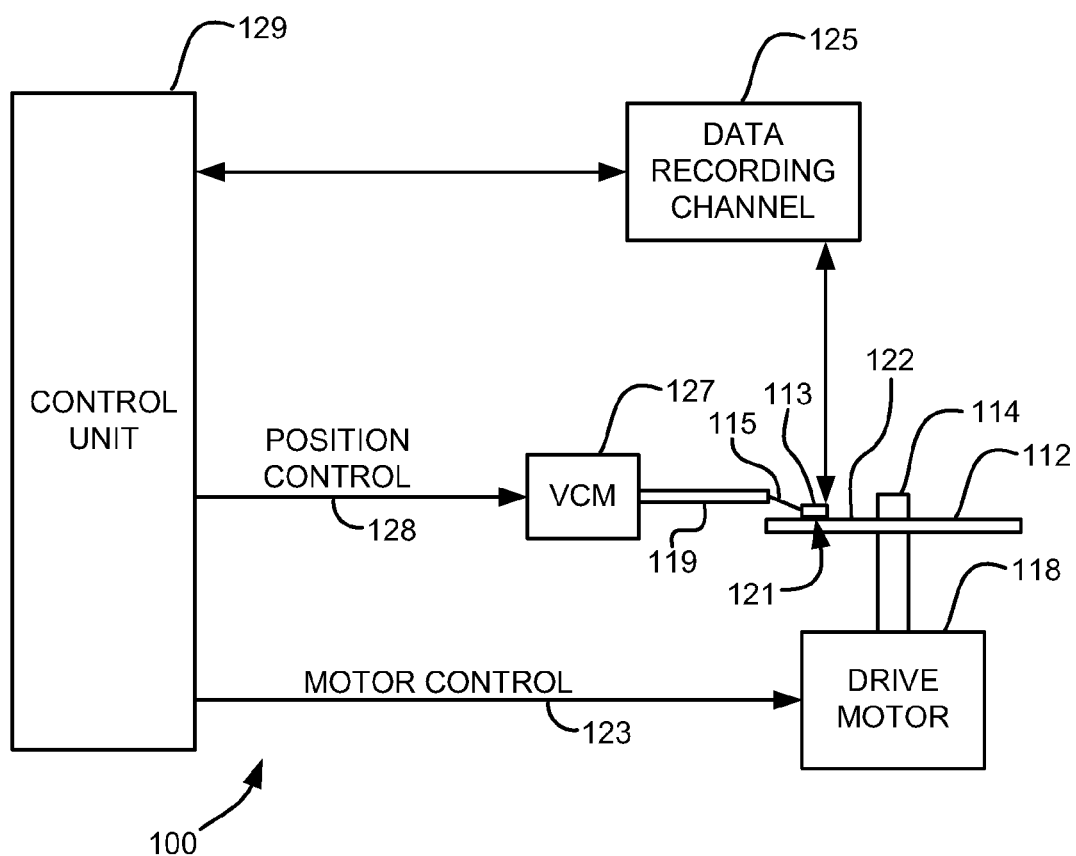
FIG. 1 is a simplified drawing of a magnetic recording disk drive system.
Figure 5:
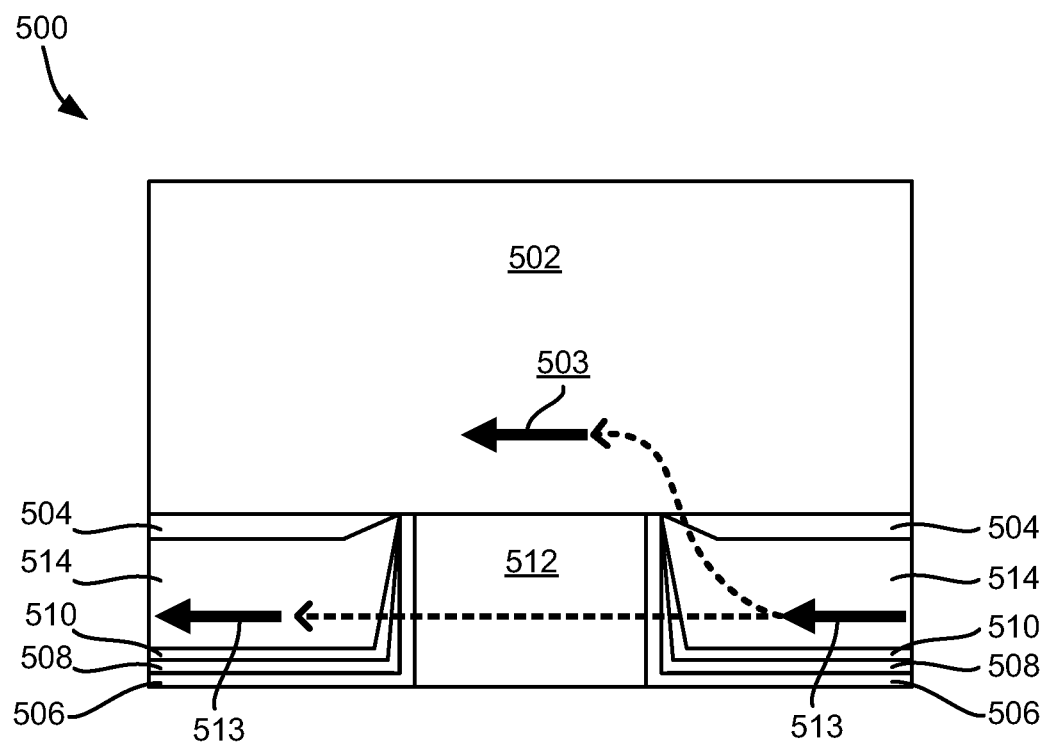
FIG. 5 shows a portion of a magnetic head, according to the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a magnetoresistance effect sensor including a free layer, a hard bias magnetic film positioned on both sides of the free layer in a track-width direction, wherein the hard bias magnetic film is adapted for performing magnetic domain control of the free layer by biasing a magnetization direction of the free layer towards a predefined direction, an upper shield positioned above the hard bias magnetic film and the magnetoresistance effect sensor; and an antiferromagnetic (AFM) layer positioned above the upper shield, wherein the upper shield includes a first upper shield layer, a second upper shield layer positioned above the first upper shield layer, and an AFM coupling layer positioned between the first upper shield layer and the second upper shield layer, the AFM coupling layer being adapted for antiferromagnetically coupling the first upper shield layer and the second upper shield layer, wherein a magnetization of the first upper shield layer is antiparallel with a magnetization of the hard magnetic bias layer.

In another general embodiment, a method for forming a magnetic head includes forming a magnetoresistance effect sensor including a free layer, forming a hard bias magnetic film on both sides of the free layer in a track-width direction, wherein the hard bias magnetic film is adapted for performing magnetic domain control of the free layer by biasing a magnetization direction of the free layer towards a predefined direction, forming a first upper shield layer above the hard bias magnetic film and the magnetoresistance effect sensor, forming a second upper shield layer above the first upper shield layer, forming an AFM coupling layer between the first upper shield layer and the second upper shield layer, the AFM coupling layer being adapted for antiferromagnetically coupling the first upper shield layer and the second upper shield layer, wherein the first upper shield layer, the AFM coupling layer, and the second upper shield layer together form an upper shield, and forming an AFM layer above the upper shield, wherein a magnetization of the first upper shield layer is antiparallel with a magnetization of the hard magnetic bias layer.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 6:
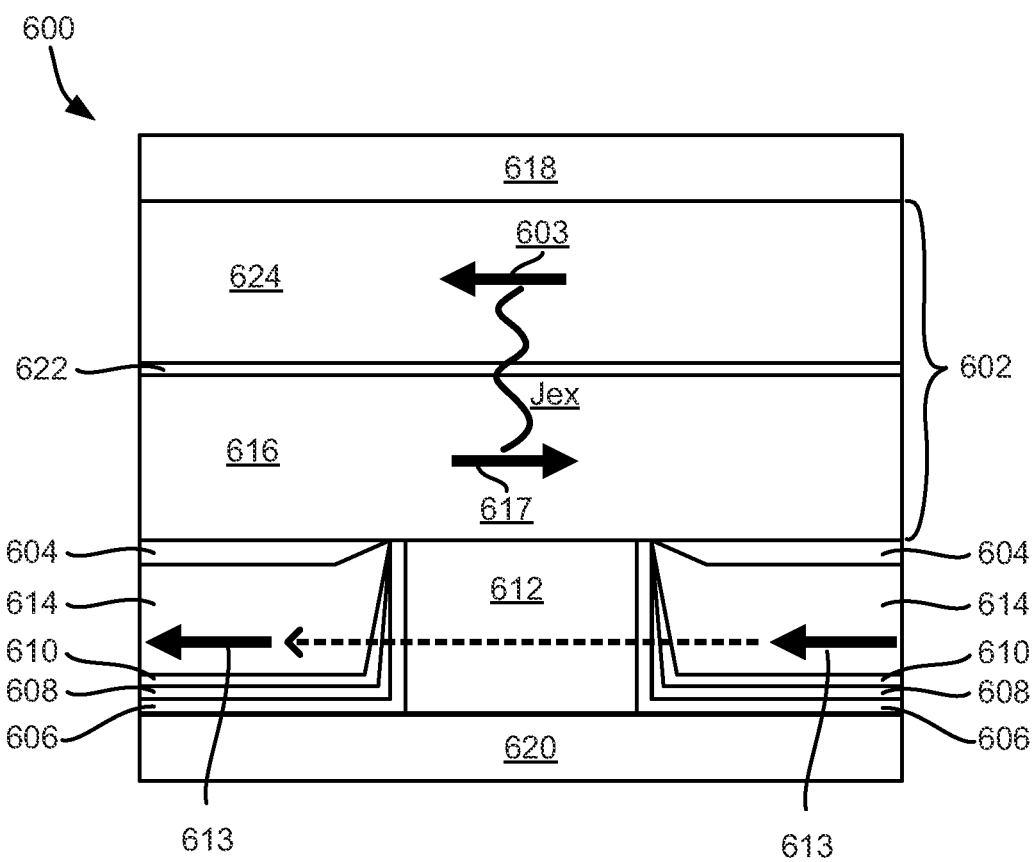
FIG. 6 shows a portion of a magnetic head, according to one embodiment.

FIG. 6 depicts a portion of a magnetic head 600 for sensing a magnetization of a magnetic medium, in accordance with one embodiment. As an option, the present magnetic head 600 may be implemented in conjunction with features from any other embodiment listed herein, such as those described with reference to the other FIGS. 1-5. Of course, however, such magnetic head 600 and others presented herein may be used in various applications and/or in permutations which may or may not be specifically described in the illustrative embodiments listed herein. Further, the magnetic head 600 presented herein may be used in any desired environment.

According to one embodiment, and with reference to FIG. 6, an upper magnetic shield 602 may be isolated using an AFM layer 622, which may comprise ruthenium (Ru) or some other suitable material known in the art. The magnetization of the upper magnetic shield 602 may be antiferromagnetically coupled. Furthermore, the magnetization 617 of the upper magnetic shield 602 at a position that is closest to the hard bias film 614 (denoted as the first upper shield layer 616) may be caused to be antiparallel (oriented in the opposite direction) to the magnetization 613 of the hard bias film 614. This causes the upper magnetic shield 602 to absorb less of the hard bias magnetic field (HBF) emanating from the hard bias film 614 since it is more difficult for the upper magnetic shield 602 to absorb the HBF.

Referring again to FIG. 6, by making the magnetization 617 of the first layer of the upper magnetic shield 616 at a position that is closest to the hard bias film 614 antiparallel (oriented in the opposite direction) with respect to the magnetization 613 of the hard bias film 614, it is more difficult for the HBF to be absorbed by the upper magnetic shield 602. As a result, the magnetization 613 of the hard bias film 614 is increased. This technique does not affect the magnetization 603 of the second layer 624 of the upper magnetic shield 602.

In one embodiment, a magnetic head 600 comprises a magnetoresistance effect sensor 612 comprising a free layer, a hard bias magnetic film 614 positioned on both sides of the free layer in a track-width direction (e.g., on the sides of the magnetoresistance effect sensor 612 as shown in FIG. 6), wherein the hard bias magnetic film 614 is adapted for performing magnetic domain control of the free layer by biasing a magnetization direction of the free layer towards a predefined direction which is often in alignment with the direction of magnetization of the hard bias magnetic film, an upper shield 602 positioned above the hard bias magnetic film 614 and the magnetoresistance effect sensor 612, wherein the upper shield 602 comprises a first upper shield layer 616, a second upper shield layer 624 positioned above the first upper shield layer 616, and an AFM coupling layer 622 positioned between the first upper shield layer 616 and the second upper shield layer 624. The AFM coupling layer 622 is adapted for antiferromagnetically coupling the first upper shield layer 616 and the second upper shield layer 624. The magnetic head 600 also comprises an AFM layer 618 positioned above the upper shield 602, wherein a magnetization 617 of the first upper shield layer 616 is antiparallel with a magnetization 613 of the hard magnetic bias layer 614.

In various embodiments, the magnetic head 600 may further comprise a lower shield 620 positioned below the magnetoresistance effect sensor 612 and the hard bias magnetic film 614, an insulating layer 606 positioned above the lower shield 620 and on both sides of the magnetoresistance effect sensor 612 in the track-width direction, a first underlayer 608 positioned above the insulating layer 606 and on both sides of the magnetoresistance effect sensor 612 in the track-width direction, and/or a second underlayer 610 positioned above the first underlayer 608, below the hard bias magnetic film 614, and on both sides of the magnetoresistance effect sensor 612 in the track-width direction.

In some further embodiments, any or all of the following may exist in the magnetic head 600. An AFM coupling constant (Jex) of the upper shield 602 may be at least about 0.25 erg/cm$^2$, the magnetoresistance effect sensor 612 may utilize tunneling magnetoresistance (TMR) to sense, the insulating layer 606 may comprise alumina, the first underlayer 608 may comprise NiTa, the second underlayer 610 may comprise CrMo, the hard bias magnetic film 614 may comprise CoCrPt, the first upper shield layer 616 and the second upper shield layer 624 may comprise NiFe, the AFM coupling layer 622 may comprise Ru, and/or the AFM layer 618 may comprise MnIr.

Figure 7:
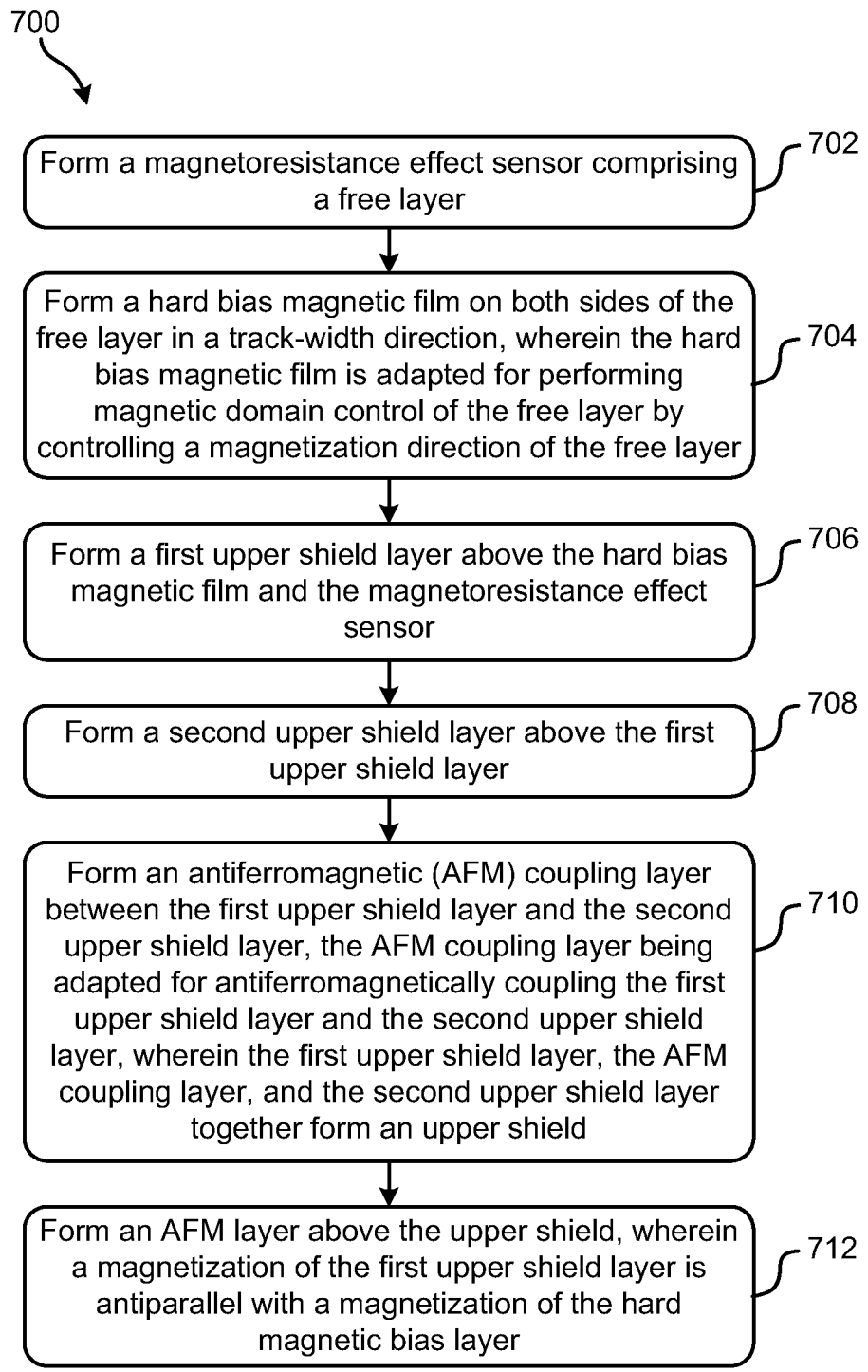
FIG. 7 shows a flowchart of a method, according to one embodiment.

FIG. 7 shows a method 700 for forming a magnetic head, in accordance with one embodiment. As an option, the present method 700 may be implemented to construct structures such as those shown in FIGS. 1-4 and 6. Of course, this method 700 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 702, a magnetoresistance effect sensor is formed. The magnetoresistance effect sensor may be of any type, and in one embodiment it may be a TMR sensor which utilizes TMR to sense. In any embodiment, the magnetoresistance effect sensor comprises a free layer.

In operation 704, a hard bias magnetic film is formed on both sides of the free layer in a track-width direction. The hard bias magnetic film is adapted for performing magnetic domain control of the free layer by controlling a magnetization direction of the free layer, as would be understood by one of skill in the art upon reading the present descriptions.

In one approach, the hard bias magnetic film may comprise CoCrPt or some other suitable material.

In operation 706, a first upper shield layer is formed above the hard bias magnetic film and the magnetoresistance effect sensor. The first upper shield layer, in some embodiments, may comprise NiFe or some other suitable material.

In operation 708, a second upper shield layer is formed above the first upper shield layer. The second upper shield layer, in some embodiments, may comprise NiFe or some other suitable material.

In operation 710, an AFM coupling layer is formed between the first upper shield layer and the second upper shield layer, the AFM coupling layer being adapted for antiferromagnetically coupling the first upper shield layer and the second upper shield layer, as would be understood by one of skill in the art. The first upper shield layer, the AFM coupling layer, and the second upper shield layer together form an upper shield.

In preferred embodiments, a magnetization of the first upper shield layer is antiparallel with a magnetization of the hard magnetic bias layer.

In some approaches, the AFM coupling layer may comprise Ru or some other suitable material.

In operation 712, an AFM layer is formed above the upper shield. In some embodiments, the AFM layer may comprise MnIr or some other suitable material.

According to one embodiment, an AFM coupling constant (Jex) of the upper shield may be at least about 0.25 erg/cm$^2$. When the term "about" is used in this context, what is intended is plus or minus 10%.

In more approaches, the method 700 may further comprise forming a lower shield below the magnetoresistance effect sensor and the hard bias magnetic film. Furthermore, in some approaches, the method 700 may also include forming an insulating layer above the lower shield and on both sides of the magnetoresistance effect sensor in the track-width direction, forming a first underlayer above the insulating layer and on both sides of the magnetoresistance effect sensor in the track-width direction, and forming a second underlayer above the first underlayer, below the hard bias magnetic film, and on both sides of the magnetoresistance effect sensor in the track-width direction. In addition, a surface of the first underlayer may be oxidized prior to forming the second underlayer in some approaches.

According to one embodiment, the insulating layer may comprise alumina, the first underlayer may comprise NiTa, and the second underlayer may comprise CrMo.

A magnetic head 600, according to one embodiment, was manufactured according to the following description, and with reference to FIG. 6. First, a TMR sensor 612 was formed above a lower shield 620, the TMR sensor comprising a free layer. A resist was then formed full film above the TMR sensor 612 and the lower shield 620, and then removed to expose the lower shield 620 by milling or some other suitable technique known in the art. An insulating layer 606 comprising an insulating material such as Al$_2$O$_3$ was then formed above the lower shield 620 and along sides of the TMR sensor 612. A first underlayer 608 comprising NiTa or some other suitable material known in the art was then formed above the insulating layer 606. Next, a second underlayer 610 comprising CrMo or some other suitable material was formed above the first underlayer 608, after oxidizing the surface of the first underlayer 608 using a suitable oxidizing gas, such as Ar+$O_2$ gas or some other suitable gas known in the art.

Then, hard magnetic material, such as CoCrPt, was formed above the second underlayer 610 and on both sides of the TMR sensor 612 as a hard bias film 614. Then, a protective layer 604 was formed above the hard bias film 614 and on both sides of the TMR sensor 612, the protective layer 604 comprising Cr, Ta, or some other suitable material or combination of materials known in the art in order to protect the hard bias film 614. After this, the resist was removed from above the TMR sensor 612 and a first upper shield layer 616 comprising NiFe or some other suitable material known in the art was formed above the TMR sensor 612 and the protective layer 604. Thereafter, an antiferromagnetic (AFM) coupling layer 622 comprising Ru or some other suitable material known in the art was formed on the first upper shield layer 616, a second upper shield layer 624 comprising NiFe or some other suitable material known in the art was formed above the AFM coupling layer 622, and an AFM layer comprising MnIr or some other suitable material known in the art was formed above the second upper shield layer 624. Annealing was then conducted on the structure 600 in a magnetic field.

After this magnetic head was manufactured, an evaluation of the magnetization of the hard bias film (HBF) was conducted. For the upper shield 602, NiFe/FeCo/Ru/FeCo/NiFe was employed. Also, MnIr was used for the AFM layer 618 that was formed on the upper shield 602. The magnetization of the hard bias film 614 comprising CoCrPt and the magnetization of the first upper shield layer 616 were made antiparallel by annealing in a magnetic field.

Figure 8:
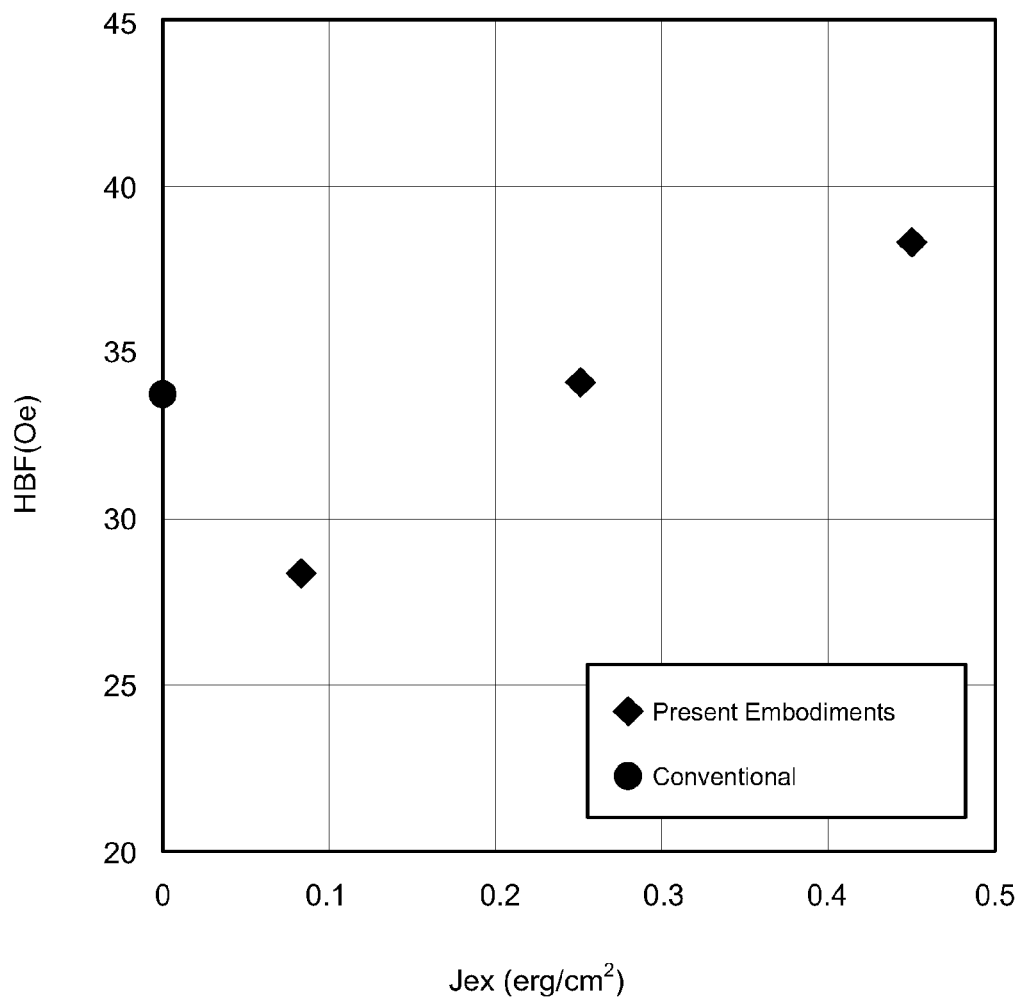
FIG. 8 is a plot showing dependence of Jex on an antiferromagnetic coupling constant of a hard bias magnetic field (HBF), according to one embodiment.

FIG. 8 shows the HBF when the AFM coupling constant (Jex) is varied. From FIG. 8, it is seen that HBF has a dependency on Jex: e.g., when Jex is increased, HBF is increased. Furthermore, when Jex is at least about 0.25 erg/$cm^2$, the HBF exceeds that of conventional structures. Jex may be increased by varying a film thickness of the AFM coupling layer (which may comprise Ru) between the first upper shield layer and the second upper shield layer, and shows a peak at a certain AFM coupling layer film thickness, assuming the AFM coupling layer comprises Ru. If the AFM coupling layer comprises a different material or a combination of Ru and some other material(s), then the peak may occur at a different thickness.

Also, Jex may be increased by varying a material of the layers that contact the AFM coupling layer (Ru). For example, Jex may be increased by employing a laminated film structure comprising a layer of NiFe and a layer of FeCo for the material of the first upper shield layer and second upper shield layer, respectively. In this embodiment, the FeCo material portion contacts the Ru film of the AFM coupling layer. This laminated film structure may be used in this embodiment instead of the single layer of NiFe, as in other structures.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   a magnetoresistance effect sensor comprising a free layer;
   a hard bias magnetic film positioned on both sides of the free layer in a track width direction, wherein the hard bias magnetic film is adapted for performing magnetic domain control of the free layer by biasing a magnetization direction of the free layer towards a predefined direction;
   an upper shield positioned above the hard bias magnetic film and the magnetoresistance effect sensor; and
   an AFM layer positioned above the upper shield, wherein the upper shield comprises:
      a first upper shield layer;
      a second upper shield layer positioned above the first upper shield layer; and
      an antiferromagnetic (AFM) coupling layer positioned between the first upper shield layer and the second upper shield layer, the AFM coupling layer being adapted for antiferromagnetically coupling the first upper shield layer and the second upper shield layer,
   wherein a magnetization of the first upper shield layer is antiparallel with a magnetization of the hard magnetic bias layer.

2. The magnetic head as recited in claim 1, further comprising a lower shield positioned below the magnetoresistance effect sensor and the hard bias magnetic film.

3. The magnetic head as recited in claim 2, further comprising:
   an insulating layer positioned above the lower shield and on both sides of the magnetoresistance effect sensor in the track-width direction;
   a first underlayer positioned above the insulating layer and on both sides of the magnetoresistance effect sensor in the track-width direction; and
   a second underlayer positioned above the first underlayer, below the hard bias magnetic film, and on both sides of the magnetoresistance effect sensor in the track-width direction.

4. The magnetic head as recited in claim 3, wherein the insulating layer comprises alumina, the first underlayer comprises NiTa, and the second underlayer comprises CrMo.

5. The magnetic head as recited in claim 1, wherein an AFM coupling constant (Jex) of the upper shield is at least about 0.25 erg/$cm^2$.

6. The magnetic head as recited in claim 1, wherein the magnetoresistance effect sensor utilizes tunneling magnetoresistance (TMR) to sense.

7. The magnetic head as recited in claim 1, wherein the hard bias magnetic film comprises CoCrPt.

8. The magnetic head as recited in claim 1, wherein the first upper shield layer and the second upper shield layer comprise NiFe, wherein the AFM coupling layer comprises Ru, and wherein the AFM layer comprises MnIr.

9. A magnetic data storage system, comprising:
   at least one magnetic head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

10. A method for forming a magnetic head, the method comprising:
   forming a magnetoresistance effect sensor comprising a free layer;
   forming a hard bias magnetic film on both sides of the free layer in a track-width direction, wherein the hard bias magnetic film is adapted for performing magnetic domain control of the free layer by biasing a magnetization direction of the free layer towards a predefined direction;

forming a first upper shield layer above the hard bias magnetic film and the magnetoresistance effect sensor;

forming a second upper shield layer above the first upper shield layer;

forming an antiferromagnetic (AFM) coupling layer between the first upper shield layer and the second upper shield layer, the AFM coupling layer being adapted for antiferromagnetically coupling the first upper shield layer and the second upper shield layer, wherein the first upper shield layer, the AFM coupling layer, and the second upper shield layer together form an upper shield; and forming an AFM layer above the upper shield, wherein a magnetization of the first upper shield layer is antiparallel with a magnetization of the hard magnetic bias layer.

11. The method as recited in claim 10, further comprising forming a lower shield below the magnetoresistance effect sensor and the hard bias magnetic film.

12. The method as recited in claim 11, further comprising:

forming an insulating layer above the lower shield and on both sides of the magnetoresistance effect sensor in the track-width direction;

forming a first underlayer above the insulating layer and on both sides of the magnetoresistance effect sensor in the track-width direction; and forming a second underlayer above the first underlayer, below the hard bias magnetic film, and on both sides of the magnetoresistance effect sensor in the track-width direction.

13. The method as recited in claim 12, further comprising oxidizing a surface of the first underlayer prior to forming the second underlayer.

14. The method as recited in claim 12, wherein the insulating layer comprises alumina, the first underlayer comprises NiTa, and the second underlayer comprises CrMo.

15. The method as recited in claim 10, wherein the magnetoresistance effect sensor utilizes tunneling magnetoresistance (TMR) to sense.

16. The method as recited in claim 10, wherein the hard bias magnetic film comprises CoCrPt.

17. The method as recited in claim 10, wherein the first upper shield layer and the second upper shield layer comprise NiFe, wherein the AFM coupling layer comprises Ru, and wherein the AFM layer comprises MnIr.

18. The method as recited in claim 10, wherein an AFM coupling constant (Jex) of the upper shield is at least about $0.25$ erg/cm$^2$.

* * * * *